(12) United States Patent
Sakai et al.

(10) Patent No.: US 9,630,266 B2
(45) Date of Patent: Apr. 25, 2017

(54) SAW BAND GUIDING DEVICE

(71) Applicants: AMADA COMPANY, LIMITED, Kanagawa (JP); AMADA MACHINE TOOLS CO., LTD., Kanagawa (JP)

(72) Inventors: Norihisa Sakai, Kanagawa (JP); Minoru Goto, Kanagawa (JP)

(73) Assignees: AMADA COMPANY, LIMITED, Kanagawa (JP); AMADA MACHINE TOOLS CO., LTD., Kanagawa (JP)

( * ) Notice: Subject to any disclaimer, the term of this patent is extended or adjusted under 35 U.S.C. 154(b) by 288 days.

(21) Appl. No.: 14/394,536

(22) PCT Filed: Apr. 18, 2013

(86) PCT No.: PCT/JP2013/061439
§ 371 (c)(1),
(2) Date: Oct. 15, 2014

(87) PCT Pub. No.: WO2013/168527
PCT Pub. Date: Nov. 14, 2013

(65) Prior Publication Data
US 2015/0068381 A1    Mar. 12, 2015

(30) Foreign Application Priority Data
May 10, 2012    (JP) ................................ 2012-108722

(51) Int. Cl.
B23D 55/08    (2006.01)
(52) U.S. Cl.
CPC ......... B23D 55/082 (2013.01); *Y10T 83/7264* (2015.04)

(58) Field of Classification Search
CPC .......................... B23D 55/082; Y10T 83/7264
See application file for complete search history.

(56) References Cited

U.S. PATENT DOCUMENTS

2012/0204700 A1*   8/2012   Tokiwa   ................ B23D 55/082
                                                                    83/820

FOREIGN PATENT DOCUMENTS

JP          54-114885          9/1979
JP          57-43102           3/1982
(Continued)

OTHER PUBLICATIONS

Machine Translation of WO 2006098349, Sep. 2006.*
(Continued)

*Primary Examiner* — Stephen Choi
(74) *Attorney, Agent, or Firm* — Greenblum & Bernstein, P.L.C.

(57) ABSTRACT

A saw band guiding device is comprised of a fixed insert holder comprising a fixed insert guide at a tip end portion of the fixed insert holder, the fixed insert guide guiding one side surface of a saw band; and a movable insert holder comprising a movable insert guide at a tip end portion of the movable insert holder, the movable insert guide being opposed to the fixed insert guide and guiding another side surface of the saw band, the movable insert holder being rotatable relative to the fixed insert holder, wherein the movable insert holder is provided to be regulated in directions where the movable insert holder gets closer to and away from the fixed insert holder so as to regulate a saw band guiding surface of the fixed insert guide and a saw band guiding surface of the movable insert guide to be parallel with each other.

4 Claims, 5 Drawing Sheets

(56) References Cited

FOREIGN PATENT DOCUMENTS

| | | |
|---|---|---|
| JP | 2003-340640 | 12/2003 |
| WO | WO-2006098349 A1 * | 9/2006 |
| WO | 2011/048943 | 4/2011 |

OTHER PUBLICATIONS

Chinese Office Action for CN App. No. 201380023944.4 issued Nov. 16, 2015, along with English-language translation thereof.
International Search Report from Patent Appl. No. PCT/JP2013/061439 having mail date of Jun. 4, 2013.

* cited by examiner

SAW BAND GUIDING DEVICE

TECHNICAL FIELD

The present invention relates to a saw band guiding device for holding and guiding a saw band in a vertical band saw or a horizontal band saw, and in particular relates to a saw band guiding device that can regulate whole surfaces of respective saw band guiding surfaces of a fixed insert guide and a movable insert guide, which hold and guide a saw band.

BACKGROUND ART

In a band saw for cutting a workpiece provided are saw band guiding devices that direct and movably guide tooth tips of a saw band provided at the band saw in a direction of cutting the workpiece. Each of the aforementioned saw band guiding devices is comprised of a fixed insert holder, unitarily at a tip end portion thereof, comprising a fixed insert guide for guiding one side surface of the saw band. Further a movable insert holder, at a tip end portion thereof, comprising a movable insert guide for guiding another side surface of the saw band, which is opposed to the fixed insert guide, is movably (rockably) provided at the fixed insert holder. The interval size between the fixed insert guide and the movable insert guide is provided to be capable of being regulated according to the thickness of the saw band (see the PTL 1 for example).

CITATION LIST

Patent Literature

[PTL 1]: Japanese Patent Application Laid-open No. 2003-340640

SUMMARY OF INVENTION

The construction of the saw band guiding device described in the PTL 1 is comprised of a fixed insert holder comprising a fixed insert guide for guiding one side surface of a saw band at a tip end portion thereof and a movable insert holder comprising a movable insert guide opposed to the fixed insert guide for guiding another side of the saw band at a tip end portion thereof, and a central portion in its longitudinal direction of the movable insert holder is rockably (rotatably) supported via a hinge pin. An insert cylinder for pressing a proximal end portion side of the movable insert holder is provided at a proximal portion side of the fixed insert holder so as to have the fixed insert guide and the movable insert guide to hold the saw band.

The aforementioned construction is a construction in which working fluid is supplied to the insert cylinder to have the fixed insert guide and the movable insert guide to hold the saw band and thereafter the working fluid is slightly exhausted out of the insert cylinder to loosen the hold by the fixed insert guide and the movable insert guide onto the saw band. Therefore an interval size between a saw band guide surface for guiding the saw band by the fixed insert guide and a saw band guide surface for guiding the saw band by the movable insert guide comes to be regulated in accordance with a thickness of the saw band, and therefore it is a preferable construction.

In the construction described in the PTL 1, however, the movable insert guide is provided to be capable of rocking via a spherical washer relative to the movable insert holder. Therefore the interval between the saw band guide surface of the fixed insert guide and the saw band guide surface of the movable insert guide is not retained to be steadily an even interval throughout the whole surface, but the movable insert guide can be slightly slanted relative to the fixed insert guide to generate a curved cut as an interval size at a tooth tip side of the saw band differs from an interval size at a back side of the saw band, and as an upstream side and a downstream side when viewed from a direction where the saw band runs differ from each other. Therefore further improvement is desired in view of preventing the curved cut to carry out cutting with a high precision.

According to an aspect of the present invention, a saw band guiding device is comprised of: a fixed insert holder comprising a fixed insert guide at a tip end portion of the fixed insert holder, the fixed insert guide guiding one side surface of a saw band; and a movable insert holder comprising a movable insert guide at a tip end portion of the movable insert holder, the movable insert guide being opposed to the fixed insert guide and guiding another side surface of the saw band, the movable insert holder being rotatable relative to the fixed insert holder, wherein the movable insert holder is provided to be regulated in directions where the movable insert holder gets closer to and away from the fixed insert holder so as to regulate a saw band guiding surface of the fixed insert guide and a saw band guiding surface of the movable insert guide to be parallel with each other.

Advantageous Effects of Invention

According to the present invention, the movable insert holder rotatably comprising the fixed insert holder is provided to regulate its position in directions where it gets closer to and away from the fixed insert holder so as to regulate the saw band guide surface of the fixed insert guide and the saw band guide surface of the movable insert guide to be parallel with each other. Therefore, even if the movable insert holder has a rotatable construction, it is allowed to regulate the saw band guide surface of the fixed insert guide and the saw band guide surface of the movable insert guide to be steadily parallel with each other and therefore the curved cut by the saw band is effectively prevented.

DESCRIPTION OF EMBODIMENTS

Certain exemplary embodiments of the present invention will be described hereinafter with reference to the appended drawings.

Figure 1:
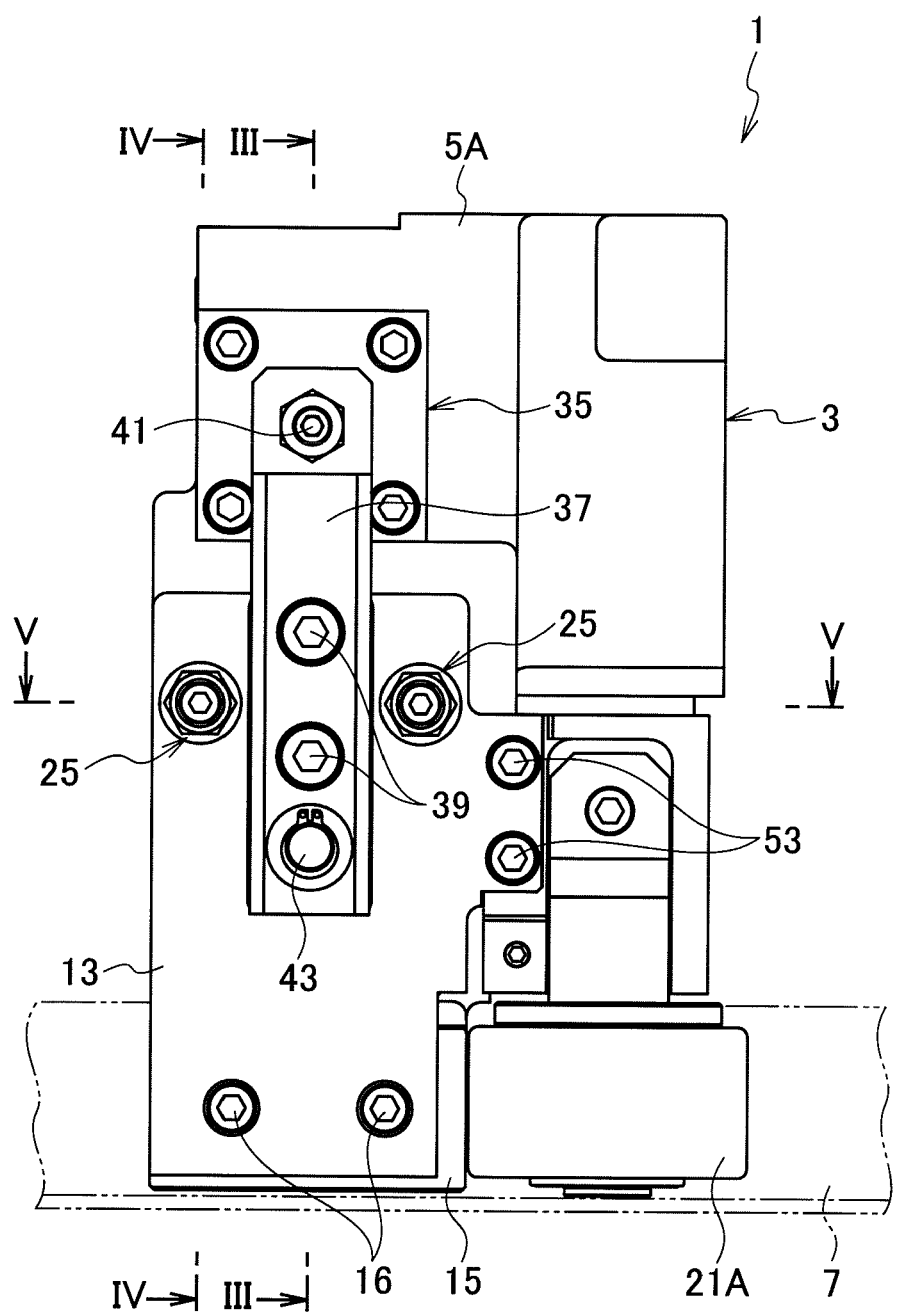
FIG. 1 is an elevational view of a guiding device according to an embodiment of the present invention viewed from a direction perpendicular to a direction where the saw band runs.

Referring to FIG. 1 as an elevational view, the saw band guiding device 1 according to an embodiment of the present invention is comprised of a fixed insert holder 3 fixed to a proper fixing portion in a band saw (not shown). A proximal end portion 5A of the fixed insert holder 3 is formed to be thick in a front-and-rear direction (a direction perpendicular to a paper in FIG. 1; a lateral direction in FIG. 2) and is unitarily comprised of a holder arm 5B (see FIG. 2) elongated from the proximal end portion 5A to a position corresponding to one side surface of the saw band 7. And, at a tip end portion of the holder arm 5B as a part of the fixed insert holder 3, a fixed insert guide 9 for guiding said one side surface of the saw band 7 is unitarily provided.

At a midway position between the proximal end portion 5A and the holder arm 5B of the fixed insert holder 3, a forward projecting portion 5C that projects forward (rightward in FIGS. 2 and 3) as being corresponding to a rear surface of the saw band 7 is provided. And, at the forward projecting portion 5C, a midway portion of a movable insert holder 13 is rockably (rotatably) supported via a hinge pin provided in parallel with a direction where the saw band 7 runs (a lateral direction in FIG. 1; a direction perpendicular to the paper of FIGS. 2 and 3) and in such a way as to be rotatable. At a tip end portion of the movable insert holder 13, a movable insert guide 15 that guides another side surface of the saw band 7 as being opposed to the fixed insert guide 9 is unitarily fixed at a tip end portion of the movable insert holder 13 by means of a fixture 16 such as an attachment bolt (see FIG. 1).

Therefore, when the saw band guide surface 9A where the fixed insert guide 9 guides the saw band 7 and the saw band guide surface 15A where movable insert guide 15 guides the saw band 7 are regulated to be in a parallel state, the movable insert guide 15 does not rock relative to the movable insert holder 13, thereby the saw band guide surface 9A of the fixed insert guide 9 and the saw band guide surface 15A of the movable insert guide 15 are, throughout these whole surfaces, steadily kept to be parallel with each other. Therefore the slant of the saw band 7 in a clockwise direction or an anticlockwise direction in FIGS. 2 and 3, which is held and guided by the saw band guide surface 9A of the fixed insert guide 9 and the saw band guide surface 15A of the movable insert guide 15, can be restricted so that the curved cut at the time of cutting the workpiece can be effectively prevented.

At the forward projecting portion 5C, backup holders 19 rotatably comprising backup rollers 17 as an example of backup members for holding a portion of the back of the portion held and guided by the fixed insert guide 9 and the movable insert guide 15 is unitarily provided. Further at the fixed insert holder 3, a small guide roller 21B of paired large and small guide rollers 21A,21B (see FIG. 5) for holding and guiding the saw band 7 is rotatably provided as being close to the fixed insert guide 9 and the movable insert guide 15.

Although it has a construction in that the movable insert holder 13 rocks (rotates) in a front-and-rear direction (lateral direction in FIGS. 2-4), the movable insert holder 13 is provided to be capable of regulating its position in front and rear directions (directions where it gets closer to and away from the holder arm 5B of the fixed insert holder 3) so as to regulate the saw band guide surface 15A of the movable insert guide 15 to be parallel with the saw band guide surface 9A of the fixed insert guide 9. In more detail, a fitting hole 23 where the movable insert holder 13 fits with the hinge pin 11 is formed as a hole elongated in a front-and-rear direction.

Further, to regulate the movable insert holder 13 in the front and rear directions, a front-and-rear direction regulating means 25 (see FIG. 5) is provided at the movable insert holder 13. In more detail, pressure screws 29 of a pipe-like shape, which by these tip end portions press a plane portion 27 formed on the hinge pin 11, are screwed in positions corresponding to vicinities of both ends of the hinge pin 11. And, tip end portions of tensile bolts 31 penetrating the pressure screws 29 of a pipe-like shape are screwed in the hinge pin 11. Further, locking nuts 33 are screwed on outer peripheries of the pressure screws 29.

By the aforementioned construction, when the pressure screws 29 are tightened while the tensile bolts 31 and the locking nuts 33 are kept in a loosened state, the pressure screws 29 press the hinge pin 11, thereby regulating the position of the movable insert holder 13 in the front direction (rightward in FIG. 4 and downward in FIG. 5) relative to the hinge pin 11. Conversely, when the pressure screws 29 are rotated in directions of being loosened while the locking nuts 33 are in a loosened state, the movable insert holder 13 can be regulated in its position in the rear direction relative to the hinge pin 11 in accordance with the degree of loosening of the pressure screws 29. And, by tightening the tensile bolts 31 and the locking nuts 33, the pressure screws 29 can be fixed in an immovable state with the movable insert holder 13.

As being understood already, by regulating the movable insert holder 13 in the front and rear directions relative to the hinge pin 11, the slant of the saw band guide surface 15A of the movable insert guide 15 in the front and rear directions (the slant in the lateral directions in FIGS. 2, 3 and 4) relative to the saw band guide surface 9A of the fixed insert guide 9 can be regulated. More specifically, the saw band guide surface 15A of the movable insert guide 15 can be regulated in vertical directions in FIGS. 2, 3 and 4 relative to the saw band guide surface 9A of the fixed insert guide 9.

Figure 5:
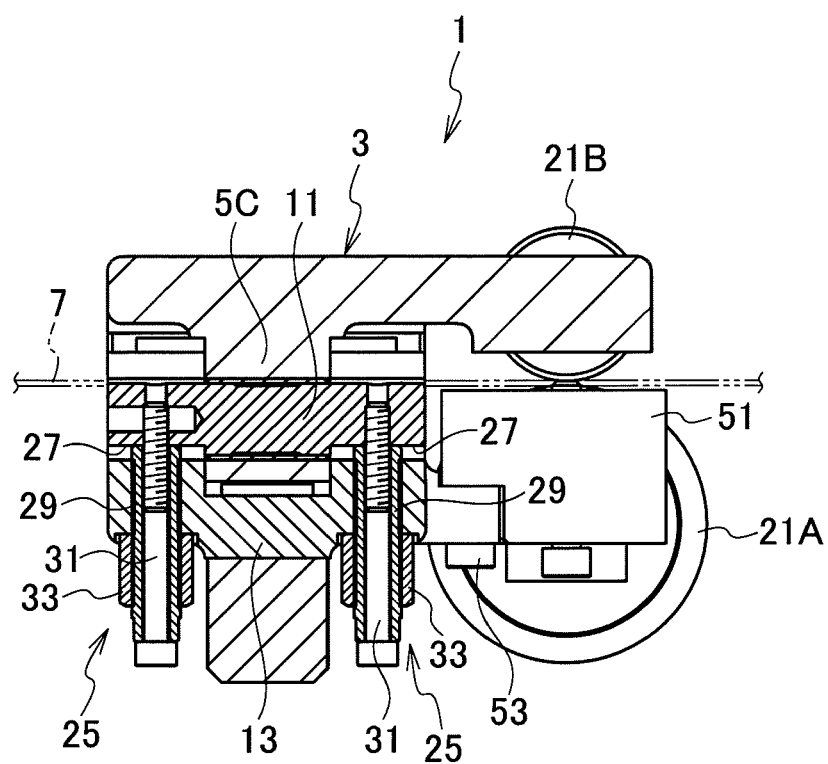
FIG. 5 is a cross sectional view of the guiding device taken from the line V-V in FIG. 1.

And, by regulating the front-and-rear direction regulating means 25 at both sides in the left and the right in FIG. 5, the saw band guide surface 15A of the movable insert guide 15 can be regulated to be parallel with an axial center of the hinge pin 11. Therefore the whole surface of the saw band guide surface 15A of the movable insert guide 15 can be regulated to be parallel with the whole surface of the saw band guide surface 9A of the fixed insert guide 9. In other words, in a view in a direction where the saw band 7 runs (the lateral direction in FIG. 5), the upstream side or the downstream side of the movable insert guide 15 can be regulated in directions where it gets closer to and away from the fixed insert guide 9.

Figure 2:
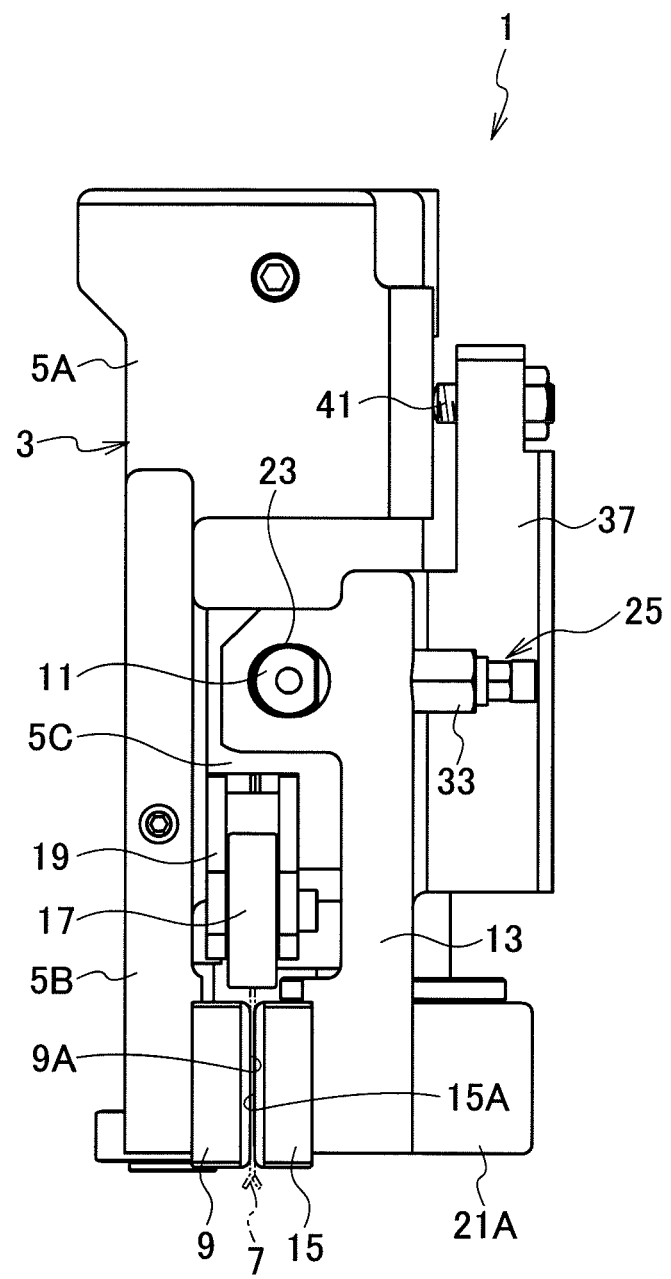
FIG. 2 is a side view of the guiding device viewed from the direction where the saw band runs.
Figure 3:
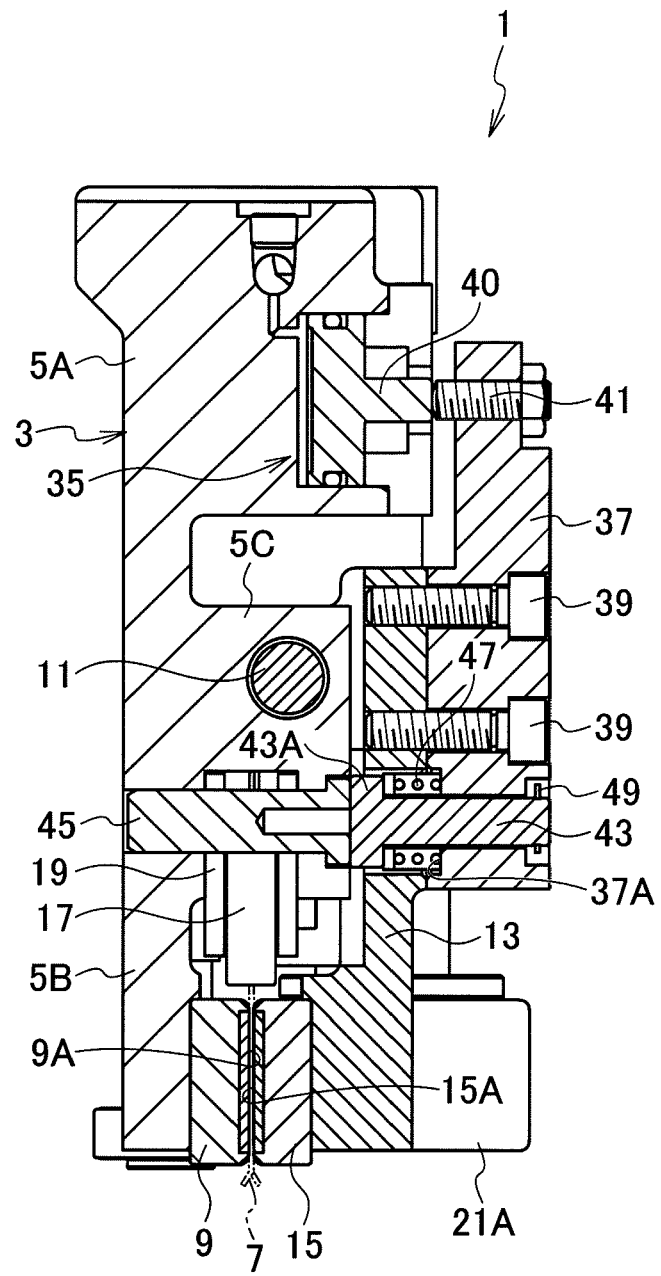
FIG. 3 is a cross sectional view of the guiding device taken from the line in FIG. 1.
Figure 4:
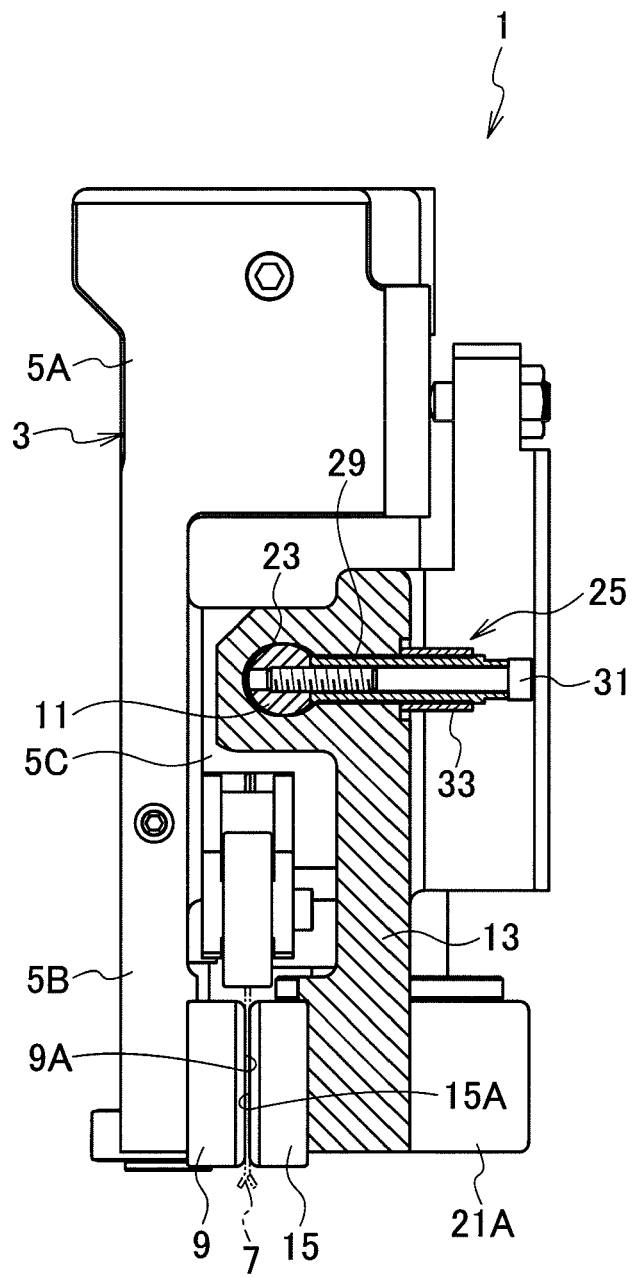
FIG. 4 is a cross sectional view of the guiding device taken from the line IV-IV in FIG. 1.

Therefore, when the saw band 7 is held and guided by the saw band guide surface 9A of the fixed insert guide 9 and the saw band guide surface 15A of the movable insert guide 15, the slant in a clockwise direction or an anticlockwise direction in FIGS. 2-4 can be prevented, and as well the slant of the saw band 7 in the vertical direction in FIG. 5 can be prevented. More specifically, when cutting of the workpiece is carried out by means of the saw band 7, the slant of the saw band 7 in a cutting direction relative to the workpiece and in the direction perpendicular to the direction where the saw band 7 runs and minute curvature of the saw band 7 in the same directions are effectively prevented, thereby cutting of the workpiece can be carried out with a higher precision.

For the purpose of rocking (rotating) the movable insert holder 13 around the hinge pin 11 in the front-and-rear direction, at the proximal end portion 5A of the fixed insert holder 3, a pressure actuator 35 such as a hydraulic cylinder (see FIG. 3) is provided. And, with the movable insert holder 13, a connection arm 37, a tip end portion of which reaches a position corresponding to the pressure actuator 35, is unitarily fixed by means of a plurality of fixtures 39 such as bolts. And, at the tip end side of the connection arm 37, a regulator member 41 such as a regulation screw pressed by a pressure member 40 such as a piston rod provided at the pressure actuator 35 to be movable in reciprocating motion is provided to be capable of regulating projection.

In order to move the movable insert guide 15 in a direction where it gets away from the fixed insert guide 9 when pressure by the pressure actuator 35 is canceled, a pressure pin 43 (see FIG. 3) penetrating the movable insert holder 13 and the connection arm 37 in such a way as to be movable in front and rear directions is provided. A large-sized head portion 43A of the pressure pin 43 is provided to be capable of getting in contact with a contact pin 45 provided at the fixed insert holder 3. And, in between the head portion 43A of the pressure pin 43 and a concave portion 37A formed on the connection arm 37 repulsively loaded is a repulsive member 47 such as a coil spring. Further, at a tip end portion of the pressure pin 43 provided is an anti-displacement member 49 such as an E-ring.

By the aforementioned construction, by putting the pressure member 40 of the pressure actuator 35 in reciprocating motion, the movable insert holder 13 is put into rocking motion in left and right directions having the hinge pin 11 as a center in FIG. 3. Here, when the pressure member 40 is in a state of projecting operation to reach a stroke end, by regulating a degree of projection of the regulator member 41 in contact with the pressure member 40, an interval between the saw band guide surface 9A of the fixed insert guide 9 and the saw band guide surface 15A of the movable insert guide 15 can be regulated to be a proper interval adapted for the thickness of the saw band 7.

As being understood already, the respective saw band guide surfaces 9A,15A of the fixed insert guide 9 and the movable insert guide 15 can be regulated to be parallel with each other and to have a proper interval adapted for the thickness of the saw band 7. Therefore force in holding the saw band 7 by the fixed insert guide 9 and the movable insert guide 15 is prevented from being excessive and a slant or a curvature of the saw band 7 in the front-and-rear direction can be suppressed so that curved cut is prevented.

It is structured that, at a time of regulating the interval between the fixed insert guide 9 and the movable insert guide 15, the interval between the guide rollers 21A,21B can be regulated simultaneously. More specifically, at the movable insert holder 13, a movable block 51 (see FIG. 5) rotatably supporting the guide roller 21A is unitarily fixed by means of fixtures 53 such as bolts. Therefore, if the interval between the fixed insert guide 9 and the movable insert guide 15 is regulated, the interval between the guide rollers 21A,21B is simultaneously regulated.

As being understood from the above descriptions, the whole surface of the saw band guide surface 9A of the fixed insert guide 9 and the whole surface of the saw band guide surface 15A of the movable insert guide 15 can be regulated to be parallel with each other and the interval between the saw band guide surfaces 9A,15A can be regulated to be a proper interval adapted for the thickness of the saw band 7. Therefore curved cut at a time of cutting the workpiece by the saw band 7 can be effectively prevented and the cutting can be carried out with a higher precision.

Although the invention has been described above by reference to certain embodiments of the invention, the invention is not limited to the embodiments described above. Modifications and variations of the embodiments described above will occur to those skilled in the art, in light of the above teachings.

INDUSTRIAL APPLICABILITY

A saw band guiding device that effectively prevents curved cut of a saw band is provided.

The invention claimed is:

1. A saw band guiding device comprising:
   a fixed insert holder;
   a fixed insert guide fixed to a tip end portion of the fixed insert holder, the fixed insert guide having a first saw band guiding surface for guiding one side surface of a saw band;
   a movable insert holder being rotatable relative to the fixed insert holder;
   a movable insert guide fixed to a tip end portion of the movable insert holder, the movable insert guide being opposed to the fixed insert guide and having a second saw band guiding surface for guiding another side surface of the saw band;
   a hinge pin fixed to the fixed insert holder and directed in parallel with the first saw band guiding surface; and
   an elongated hole opened on the movable insert holder and elongated in a direction perpendicular to the first saw band guiding surface,
   wherein the hinge pin fits in the elongated hole to pivotally support the movable insert holder while allowing the movable insert holder to move in the direction perpendicular to the first saw band guiding surface, whereby the movable insert holder is enabled to be regulated in directions where the movable insert holder gets closer to and away from the fixed insert holder while the first saw band guiding surface and the second saw band guiding surface are maintained parallel with each other.

2. The saw band as recited in claim 1, wherein an upstream side or a downstream side of the movable insert guide when viewed in a direction where the saw band runs is provided to be regulated in directions where the upstream side or the downstream side gets closer to and away from the fixed insert guide.

3. The saw band as recited in claim 1, further comprising:
   a regulating bolt including a tubular screw penetrating the movable insert holder to press the hinge pin, a pressure screw rotatable within the tubular screw and screwed in the hinge pin, and a locking nut screwed on the tubular screw, the regulating bolt regulating a position of the movable insert holder relative to the hinge pin.

4. The saw band as recited in claim 3, wherein the hinge pin comprises a planar portion to be pressed by the tubular screw.

* * * * *